(12) United States Patent
Baudry et al.

(10) Patent No.: US 7,165,203 B2
(45) Date of Patent: Jan. 16, 2007

(54) METHOD FOR CONTROLLING DATA RETRANSMISSION AND CONTROL UNIT FOR IMPLEMENTING THE METHOD

(75) Inventors: Benjamin Baudry, Meudon (FR); Olivier Isnard, Viroflay Cedex (FR)

(73) Assignee: Nortel Networks Limited, St. Laurent (CA)

( * ) Notice: Subject to any disclaimer, the term of this patent is extended or adjusted under 35 U.S.C. 154(b) by 312 days.

(21) Appl. No.: 10/667,778

(22) Filed: Sep. 22, 2003

(65) Prior Publication Data

US 2004/0123210 A1 Jun. 24, 2004

(30) Foreign Application Priority Data

Oct. 16, 2002 (FR) .................................. 02 12862

(51) Int. Cl.
*H04L 1/18* (2006.01)

(52) U.S. Cl. ..................................................... 714/748

(58) Field of Classification Search ................ 714/748, 714/749
See application file for complete search history.

(56) References Cited

U.S. PATENT DOCUMENTS 5,745,502 A * 4/1998 Khayrallah et al. ......... 714/751

FOREIGN PATENT DOCUMENTS

WO WO 01/78489 10/2001
WO WO 02/01735 1/2002

OTHER PUBLICATIONS

ETSI TS 125 301 V4.2.0 (Dec. 2001) Technical Specification, Universal Mobile Telecommunications System (UMTS); "Radio Interface Protocol Architecture (3GPP TS 25.301 version 4.2.0 Release 4)," pp. 1-40.
ETSI TS 125 322 V5.1.0 (Jun. 2002) Technical Specification, "Universal Mobile Telecommunications System (UMTS); Radio Link Control (RLC) protocol specification (3GPP TS 25.322 version 5.1.0 Release 5)," pp. 1-77.
ETSI TS 125 401 V4.2.0 (Sep. 2001) Technical Specification, "Universal Mobile Telecommunications System (UMTS); UTRAN Overall Description (3GPP TS 25.401 version 4.2.0 Release 4)," pp. 1-39.
ETSI TS 125 427 V4.3.0 (Dec. 2001) Technical Specification, "Universal Mobile Telecommunications System (UMTS); UTRAN Iub/Iur Interface User Plane Protocol for DCH Data Streams (3GPP TS 25.427 version 4.3.0 Release 4)," pp. 1-34.

* cited by examiner

*Primary Examiner*—James C Kerveros
(74) *Attorney, Agent, or Firm*—Trop, Pruner & Hu, PC (57) ABSTRACT

Frames exchanged between a control unit and a radio terminal via base stations are encapsulated, with timestamping information, in frames over an asynchronous interface between the control unit and each station. The timestamping information accompanying a data frame over the asynchronous interface indicates an instant of transmission of the said frame by each station according to a time counter specific to the radio section of the connection. The information accompanying an acknowledgement frame over the asynchronous interface indicates an instant of reception of the said frame by each station according to the said time counter. On reception of an acknowledgement frame accompanied by a timestamping information element indicating an instant of reception and indicating the non-reception by the terminal of the said data frame, the reception of the acknowledgement frame is selectively taken into account for the retransmission of the said data frame.

12 Claims, 5 Drawing Sheets

METHOD FOR CONTROLLING DATA RETRANSMISSION AND CONTROL UNIT FOR IMPLEMENTING THE METHOD

BACKGROUND OF THE INVENTION

The present invention relates to the techniques of data retransmission in telecommunications systems. It relates more particularly to the control of data retransmission in systems using a data acknowledgement mode.

Numerous telecommunications systems use a data acknowledgement mode which, for a communication object receiving data, consists in an acknowledgement of reception, the transmission of which is initiated by the receiver or requested by the transmitting object. Conversely, if the receiving object does not receive or receives incorrectly certain data which were addressed to it, it can send to the transmitting object a negative acknowledgement for these data, thus indicating the failure of the transmission of the corresponding data.

Conventionally, a data retransmission mechanism can be based on the acknowledgement mechanism. In particular, when a negative acknowledgement is received by the data transmitting object, the latter can decide to retransmit the data to which this negative acknowledgement related.

An example of a retransmission mechanism of this type is that specified in third-generation cellular networks of the UMTS (Universal Mobile Telecommunication System) type, standardized by the 3GPP (3rd Generation Partnership Project) organization.

The invention is described below, without intent to limit the generality of its object, in its application to a UMTS network in frequency division duplex. (FDD) mode, an example of the architecture of such a network being shown in FIG. 1.

Figure 1:
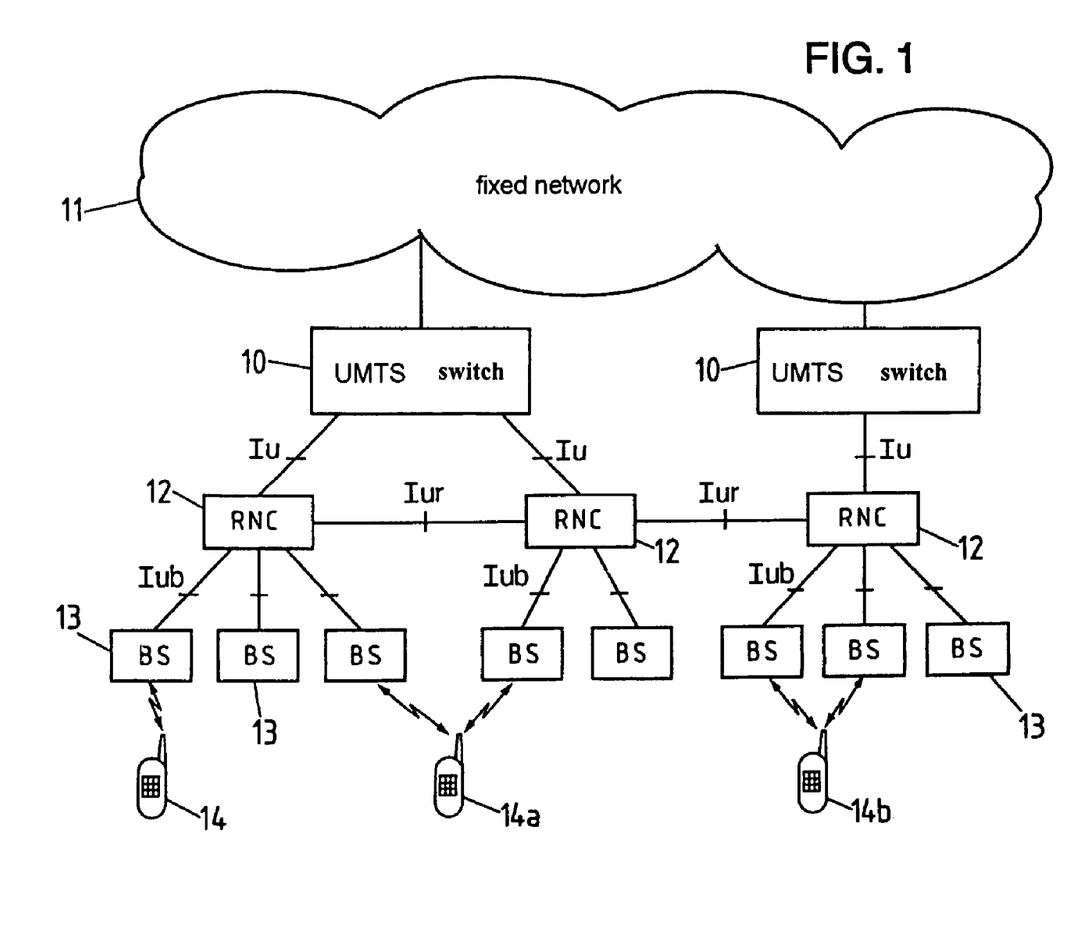
FIG. 1, described above, is a diagram of the architecture of a UMTS communication system.

The switches of the mobile service 10, belonging to a core network (CN), are connected, on the one hand, to one or more fixed networks 11, and, on the other hand, to control units or RNCs (Radio Network Controllers) 12 by means of what are known as Iu interfaces. Each RNC 12 is connected to one or more radio base stations 13 by means of what are known as Iub interfaces. The radio stations 13, distributed over the network coverage area, can communicate by radio with the mobile terminals 14, 14a, 14b called UE (User Equipment). The radio stations can be grouped to form nodes, called "Nodes B". Some RNCs 12 can also communicate with each other by means of what is known as an Iur interface. The RNCs and the radio stations form an access network called UTRAN (UMTS Terrestrial Radio Access Network).

The UTRAN comprises elements of layers 1 and 2 of the ISO (International Standard Organization) model in order to provide the required links over the radio interface (called Uu), and a radio resource control (RRC) stage 15A belonging to layer 3, as described in technical specification 3G TS 25.301, "Radio Interface Protocol Architecture", version 4.2.0, published in December 2001 by 3GPP. Viewed from the higher layers, the UTRAN acts simply as a link between the UE and the CN.

Figure 2:
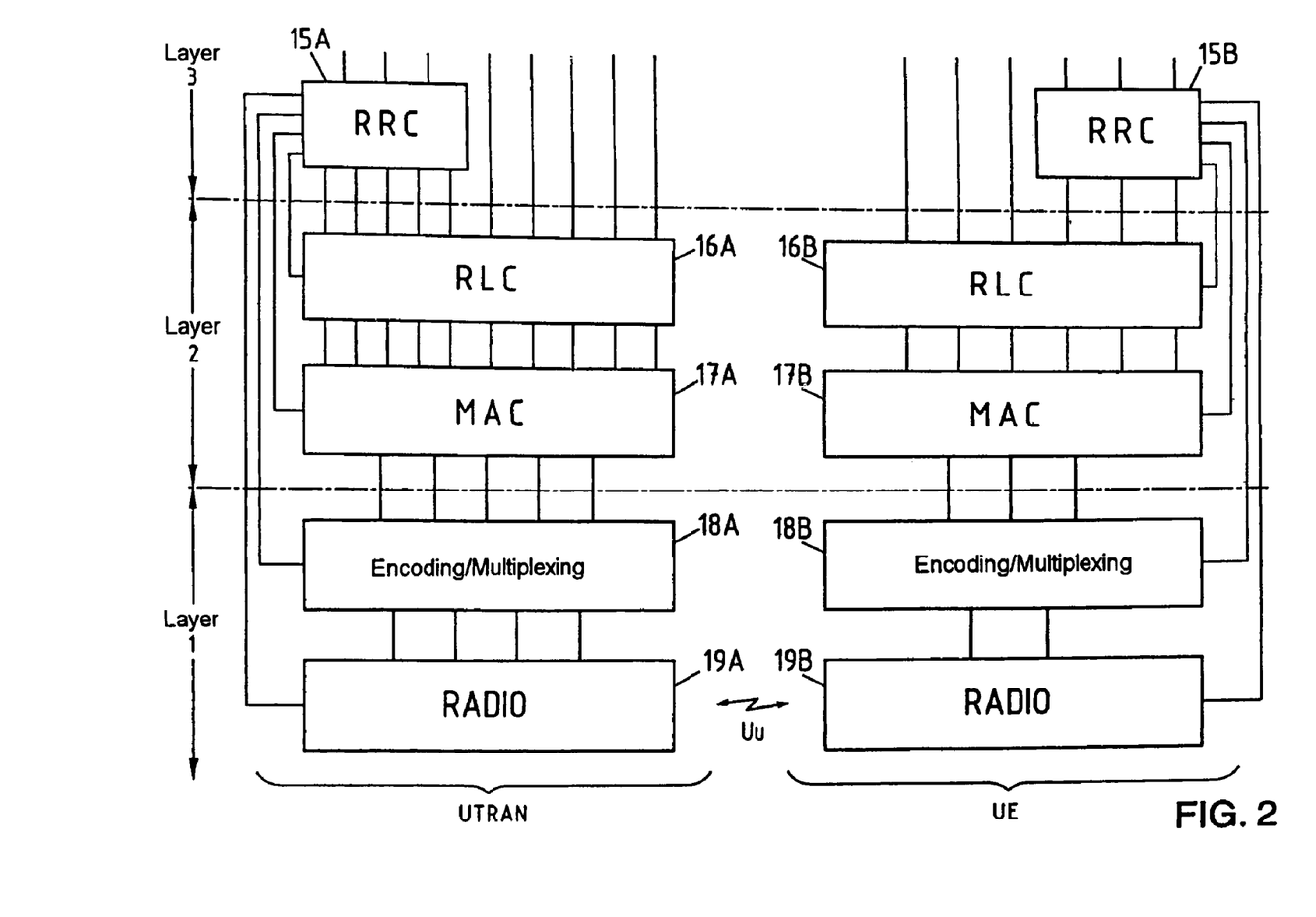
FIG. 2, described above, is a diagram representing the protocol layers common to the UTRAN and the UE.

FIG. 2 shows the RRC stages 15A, 15B and the stages of the lower layers which belong to the UTRAN and to a UE. On each side, layer 2 is divided into a radio link control (RLC) stage 16A, 16B and a medium access control (MAC) stage 17A, 17B. A detailed description of the radio link control can be found, in particular, in technical specification TS 25.322, version 5.1.0, "Radio Link Control (RLC) protocol specification"., published by 3GPP in June 2002. Layer 1 comprises an encoding and multiplexing stage 18A, 18B. A radio stage 19A, 19B transmits the radio signals on the basis of trains of symbols supplied by the stage 18A, 18B, and receives the signals in the other direction.

There are different ways of adapting the protocol architecture according to FIG. 2 to the hardware architecture of the UTRAN according to FIG. 1, and, in general, different organizations can be adopted according to the types of channel (see section 11.2 of technical specification 3G TS 25.401 "UTRAN Overall Description", version 4.2.0, published in September 2001 by 3GPP). The RRC, RLC and MAC stages are located in the RNC 12. Layer 1 is located, for example, in Node B. Part of this layer may, however, be located in the RNC 12.

In one mode of operation of the system, the RLC frames are exchanged in acknowledged mode. Thus, a polling bit can be activated in certain RLC frames sent by an RNC 12 to a UE, in order to interrogate the UE about the reception of one or more RLC data frames transmitted previously. The UE responds to the polling with an RLC signal frame containing an acknowledgement, which may be positive (ACK) or negative (NACK), and which indicates the correct or incorrect reception of the RLC data frames transmitted previously. Various algorithms can be used by the RLC layer 16A of the RNC to process the positive and/or negative acknowledgements transmitted by the UE. In general, the RNC 12 retransmits the RLC data frames to which the NACK related, on receiving the latter.

Figure 3:
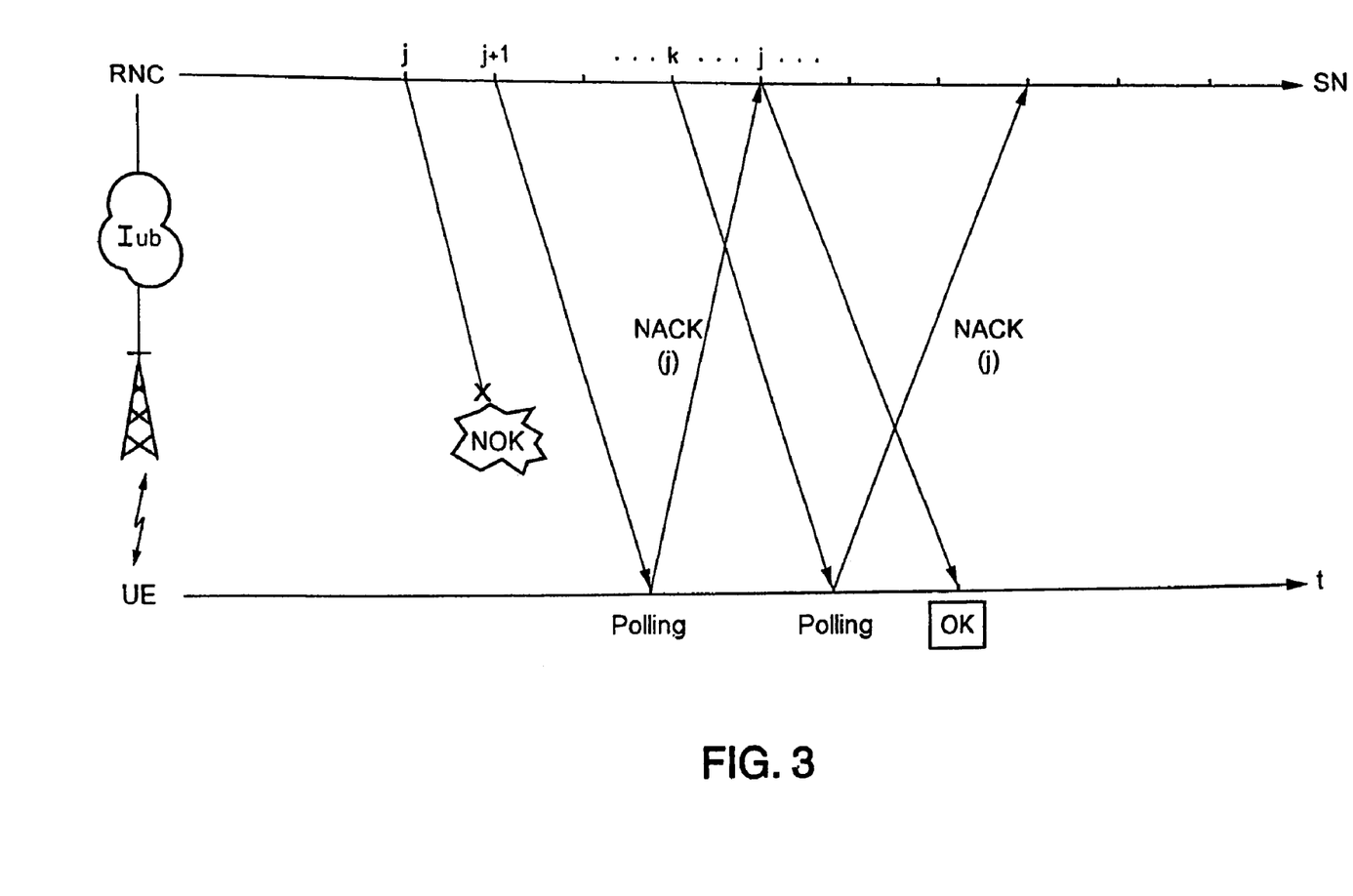
FIG. 3, described above, is an example of a mechanism for polling and data retransmission according to the prior art.

When a plurality of polling signals are sent in succession by the RNC 12, for example following the loss of a data frame j (according to a sequence number SN) sent to a UE (reference NOK in FIG. 3), the same number of successive NACKs are sent by the UE. If the frame j is retransmitted following the reception of a NACK at the RNC, it is possible, on this occasion, that the corresponding data may be received correctly at the UE (reference OK in the figure). If this retransmission takes place immediately after polling, for example, a NACK will still be sent by the UE, as shown in FIG. 3. Consequently, when the RNC receives the NACK, the data will have been successfully received at the UE following the last retransmission.

There are two principal known solutions for preventing a further retransmission from taking place when the frame j of the preceding example has been correctly received after an initial transmission failure.

According to a first method, the UE triggers a timeout, called Timer_Status_Prohibit, described in section 9.5 of the technical specification 25.322 cited above, on receiving the first polling that it receives. The next polling signals received are ignored by the UE until the expiry of the timeout for preventing the sending of a second NACK to the UE when it is possible for the retransmission of the data following the sending of the first NACK by the UE to result in correct reception at the UE. Thus, if the retransmitted data have actually been received before the expiry of the timeout, the next acknowledgement sent by the UE can be an ACK, making it possible to avoid further unnecessary retransmissions.

According to a second method, the UE sends a NACK in response to each polling without distinction, following non-reception or incorrect reception of data, but the NACKs are filtered at the RNC 12. Thus, the second NACK transmitted by the UE in the example shown in FIG. 3 is ignored by the RNC if too short a time has elapsed since the first NACK was received by the RNC. This period is conventionally determined by a timeout, as in the preceding case, but is monitored at the RNC. Conversely, if a new NACK is received at the RNC after the expiry of the timeout, this NACK is responded to, resulting in a further retransmission, since it may indicate that the first retransmission has not resulted in correct reception at the UE.

In the two methods outlined above, the timeouts considered should ideally have the value of the round trip delay (RTD) between the RNC and the UE. This is because the time of an RTD is required for the UE to receive the data retransmitted after the sending of a NACK (first method), and for the RNC to receive a significant acknowledgement following the transmission of data (second method). Conversely, a timeout longer than the RTD could cause a delay in taking into account the positive acknowledgements at the RNC, thus slowing down the useful transmission speed, particularly in cases where the quantity of data which can be transmitted by the RNC without waiting for the acknowledgement of the previously transmitted data is small.

The estimation of the RTD poses a significant problem, since this value is variable. It can also undergo major variations if the data have to pass through an asynchronous communication interface.

This is the case, in particular, in the UMTS system, in the Iub interface between an RNC 12 and radio stations 13 using protocols such as ATM (Asynchronous Transfer Mode) and AAL2 (ATM Adaptation Layer No. 2). Above these protocol layers, a frame protocol (FP) is used in the user plane to enable the RNC to communicate with the Node B or nodes involved in a communication with a given UE. The FP is described in technical specifications 3G TS 25.427, "UTRAN Iub/Iur Interface User Plane Protocol for DCH Data Streams", version 4.3.0, published in December 2001 by 3GPP.

When a plurality of RNCs are involved in a communication with a UE, there is generally a serving RNC. (SRNC), in which are located the modules relating to layer 2 (RLC and MAC), and at least one link RNC called the DRNC (Drift RNC) to which is connected a radio station with which the UE is in radio connection. In this case also, appropriate protocols such as ATM and AAL2 provide asynchronous exchanges between these RNCs through the Iur interface.

Additionally, UMTS in FDD mode supports a macrodiversity technique, in which one UE is enabled to communicate simultaneously with separate radio stations of an active set in such a way that, in the downlink direction, the UE receives the same information several times, and, in the uplink direction, the radio signal sent by the UE is captured by the radio stations to form different estimates which are subsequently combined in the UTRAN. Macrodiversity provides a gain in reception which improves the performance of the system, owing to the combination of different observations of a single item of information. It also makes it possible to provide "soft hand-off" (SHO) intercellular transfers when the UE moves.

In macrodiversity, the switching of the transport channels for multiple sending from the UTRAN or the UE and the combination of these transport channels in reception are operations carried out by a selection and combination module belonging to layer 1. This module is interfaced with the sub-layer MAC, and is located in the RNC serving the UE. If the radio stations concerned depend on different RNCs communicating through the Iur interface, one of these RNCs can act as the SRNC and the other as the DRNC.

Thus the value of the RTD between an RNC and a UE can vary considerably, particularly owing to the asynchronous nature of the Iub interface. If a radio station for which the Iub interface is slow (loaded) at the instant in question is added to or withdrawn from the active set, the RTD abruptly undergoes large variations because of the synchronization mechanisms implemented by the FP.

Because of its asynchronous nature and the fact that the routing times over all the links of the active set are taken into account, the Iub interface is largely responsible for the delays in transmission between an RNC 12 and a UE 14–14a–14b, by comparison, in particular, with the transmission delays over the Uu interface.

Another factor which can vary the RTD is the frame processing time at Node B, which can vary with time and from one Node B to another.

Even if the RTD can be estimated, the procedure for changing the Timer_Status_Prohibit parameter is only reactive to a small extent, since it requires a reconfiguration of the RLC connection. In practice, therefore, the first method above does not provide an effective means of adaptation to the variations of RTD.

An object of the present invention is to propose a good compromise between the number of retransmissions of data and the risks of decreasing the debit utile because an acknowledgement of the data is taken into account too slowly.

Another object of the invention is to enable the number of superfluous retransmissions in a communication system to be reduced without the need to estimate the RTD of the system. The invention is particularly applicable to cases where the communication system has an RTD varying significantly with time, for example because of the presence of an asynchronous communication interface.

SUMMARY OF THE INVENTION

The invention thus proposes a method for controlling data retransmission from a control unit via a connection established with a radio terminal. The control unit and the terminal exchange via the said connection, through at least one base station, first frames comprising data frames sent to the terminal and acknowledgement frames sent by the terminal and containing information relating to the acknowledgement of the first data frames. The first frames are encapsulated, with corresponding timestamping information, in second frames, for transmission between the control unit and each base station over an asynchronous interface. The timestamping information accompanying one of the data frames over the asynchronous interface indicates an instant of transmission of the said data frame by each base station with reference to a time counter specific to a radio section of the said connection. The method comprises the following steps:

the storage at the control unit of the timestamping information indicating an instant of transmission of a data frame; and upon reception at the control unit of an acknowledgement frame accompanied by timestamping information indicating an instant of transmission and containing acknowledgement information interpreted as indicating non-reception of the said data frame by the terminal, the selective taking into account of the said acknowledgement information for controlling the retransmission of the said data frame, on the basis of a comparison between the said instants of reception and transmission.

The comparison between these two instants provides a criterion usable in the repetition algorithms (ARQ) for processing the acknowledgement information in order to decide on the retransmission of certain data frame. Compared with the RTD, this criterion advantageously provides independence from the variable delays generated over asynchronous interfaces.

The selective taking into account of the reception of the acknowledgement frame makes it possible, for example, to retransmit the data frame considered not to have been received by the terminal only if the instant of reception is later than the instant of transmission by an amount exceeding a threshold, which can be of the order of ten milliseconds or which can also be close to zero (typical RTDs in the Iub interface can vary from one to several hundred milliseconds). Conversely, if the instant of reception is not later than the instant of transmission by an amount exceeding such a threshold, the reception of the acknowledgement frame can be ignored, thus preventing the retransmission of a data frame already received by the terminal.

The invention also proposes a control unit suitable for implementing the above method and comprising:

means for storing the timestamping information indicating an instant of transmission of a data frame; and means by which, upon reception of an acknowledgement frame accompanied by timestamping information indicating an instant of transmission and containing acknowledgement information interpreted as indicating non-reception of the said data frame by the terminal, the said acknowledgement information for controlling the retransmission of the said data frame is taken into account selectively, on the basis of a comparison between the said instants of reception and transmission.

DESCRIPTION OF PREFERRED EMBODIMENTS

We shall examine again the non-restrictive case of a UMTS system according to FIG. 1. As mentioned previously, the Iub interface used for exchanges between an RNC 12 and one or more Nodes B 13, is asynchronous and has a mechanism for synchronizing the transport channels according to the frame protocol FP.

The purpose of this synchronization of the transport channels is to produce a common numbering of the layer 2 frames between the UTRAN and the UE, this being achieved by means of an 8-bit connection frame number (CFN), which layer 2 manages for each transport block set (TBS) exchanged with the UE, incrementing it by one unit every 10 milliseconds.

This CFN is not transmitted over the radio interface, but is attached to the frames exchanged over the Iub interface. The physical layer translates it into a frame numbering updated for each cell, defined by a system frame number (SFN) coded in 12 bits. The Node B increments this SFN whenever a new 10 ms radio frame arrives and broadcasts its value over the common cell control channels.

For a given TBS and a given cell, the offset between the CFN and the SFN is determined before the establishment of the radio link between the Node B and the UE concerned, in terms of an offset expressed as a whole number of frames ("Frame Offset"). At the start of the radio transmission of the TBS, this offset is zero: the CFN is initialized on the SFN (modulo 256) of the first frame used for the transmission of the TBS. Before the addition of a radio link in macrodiversity, the UE measures the offset between the current CFN and the SFN broadcast by the new cell, and reports this to the SRNC. The latter deduces from this information the relevant frame offset parameter for the new cell and informs the Node B of this, so that it can take into account the offset between the CFN and SFN counters.

Thus, once the offset has been taken into account, a Node B has a reference base shared by all the other Nodes B of the active set, based on the CFN time counter of the radio connection.

Figure 4:
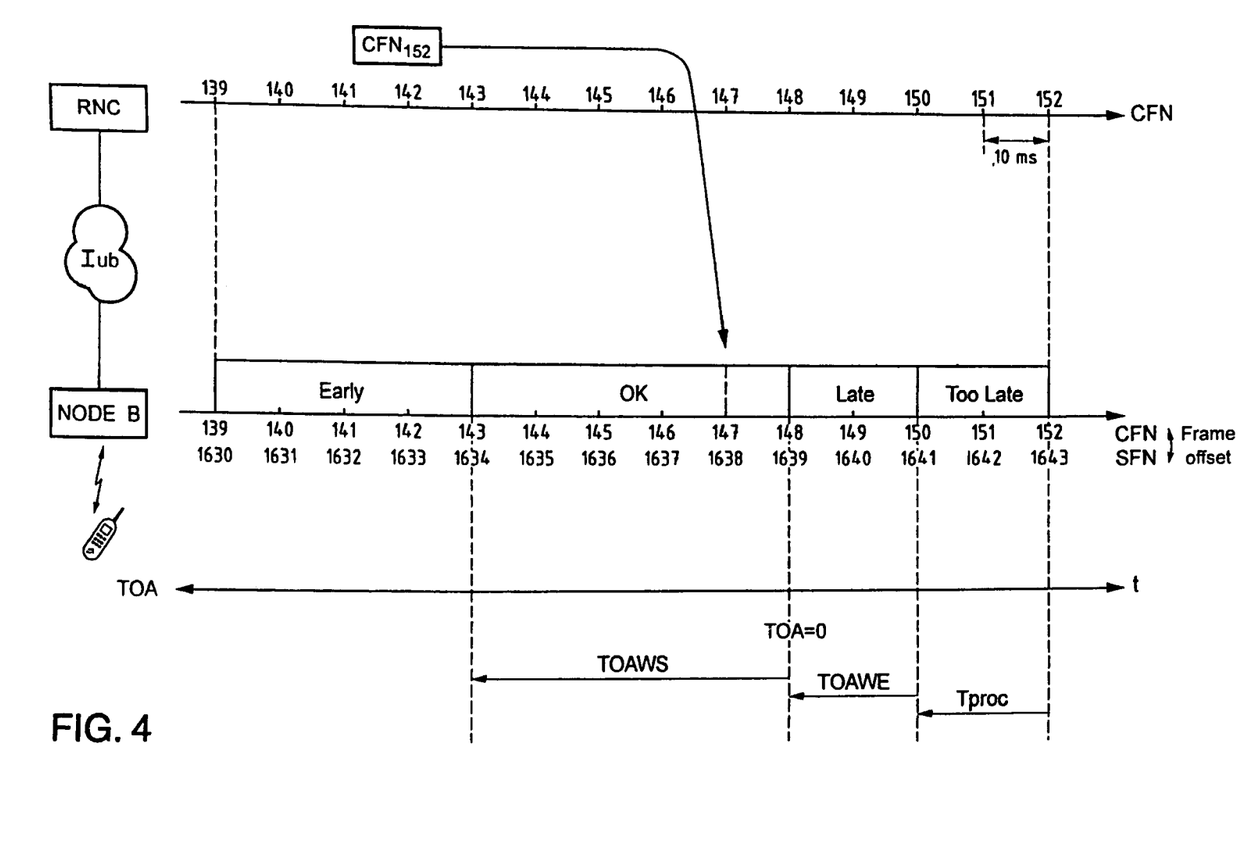
FIG. 4 is a schematic representation of the windows used for the synchronization of the Iub interface, as standardized in the UMTS system by 3GPP.

In the downlink direction, when a data frame is to be transmitted to the UE, the SRNC anticipates its transmission with respect to the CFN corresponding to the instant of transmission of the data over the interface Uu, to take into account the routing time to the Node B and the processing time required by the latter, particularly in the encoding and multiplexing stage 18A. The standard specifies a reception window for each FP frame (DCH-FP PDU) which the SRNC sends to a Node B, defined with reference to a TOA (Time Of Arrival) axis extending in the inverse direction of time with an origin at the reference point TOA=0. This window is defined by the following parameters, shown in FIG. 4:

$T_{proc}$, equal to the minimum time, depending on the equipment, required for processing one frame by the Node B before it can start to transmit it over the radio interface;

TOAWS (Time Of Arrival Window Startpoint), determining the width of the reception window. A frame received with a TOA in the range from 0 to TOAWS is considered to be received correctly ("OK" in FIG. 4, which shows the reception window for the frame of CFN 152). A frame received with a TOA greater than TOAWS is considered to have been received in advance ("Early" in FIG. 4);

TOAWE (Time Of Arrival Window End), determining the position of the reception window, in other words that of the reference point TOA=0 which precedes $T_{proc}$+ TOAWE at the instant corresponding to the start of the numbered frame period CFN (with allowance for the frame offset). If it is greater than 0, this parameter TOAWE can be used to distinguish the frames which have been received late but can still be processed by the Node B (−TOAWE<TOA<0, "Late" in FIG. 4) and the frames which have been received too late and have been destroyed by the Node B (TOA<−TOAWE, "Too Late" in FIG. 4).

If the Node B receives a data frame outside the corresponding window, it reports this to the RNC in a TAD (Timing Adjustment) frame of the FP, which comprises the CFN number of the data frame in question and the value of the TOA with which it was received. This enables the RNC to correct the instant at which it sends the next frames to the Node B.

In periods when there are no data frames to send, the RNC sends to the Node B "DL SYNC" signalling frames, each containing the CFN with respect to which this frame should be received. The Node B responds immediately to this by returning a "UL SYNC" frame, indicating this CFN and the value of TOA corresponding to the reception of this frame.

This mechanism prevents the window from shifting without the RNC being informed of this by the TAD frames.

These synchronization mechanisms are detailed in technical specification TS 25.427 cited above.

By means of these mechanisms, the RNC determines the CFN which is a timestamping information element indicating the instant of transmission of the frame over the radio interface by the radio stations of the active set. It includes this CFN in the corresponding data frame. FIG. 4 illustrates this principle: the RNC transmits a frame carrying CFN=152 somewhat in advance (at the instant corresponding to CFN=142) to compensate for the routing time to the Nodes B and the processing time required by the nodes. According to the present invention, the RNC then stores in its memory the CFN determined in this way (CFN=152 in FIG. 4).

In the uplink direction, each Node B transmits frames to the SRNC to which it is connected, via the Iub interface and also via the Iur interface if necessary. However, no timing system is provided at the Nodes B for delaying or advancing the transmission of uplink frames, so that the transmission of these frames can be spaced apart in time. Each Node B includes, in the FP frames which it transmits to the SRNC following the reception of a radio frame sent by a terminal, a CFN which is a timestamping information element indicating the instant of reception of this radio frame at the Node B.

At the SRNC, the frames received with an identical CFN number from the different Nodes B are combined regularly on expiry of a timeout ("TTI timer" or "Transmission Time Interval timer"). If some of the uplink frames are received by the SRNC after the expiry of this timeout, they are lost and not taken into account for the combination. Conversely, frames received too soon by the SRNC, in other words beyond the maximum capacity of the SRNC buffer stores, cannot be retained in memory to be taken into account for the combination of the frames.

Consequently, regardless of the data routing time over the Iub interface, the numbering according to the scale of the CFNs and the mechanisms for synchronizing the Iub interface enable the RNC to determine the instant of transmission of a downlink frame by the Nodes B, and to know the instant of reception of an uplink frame by the Nodes B.

The chronology between these instants is therefore known by the RNC, on the basis of the corresponding CFN numbers.

Figure 5:
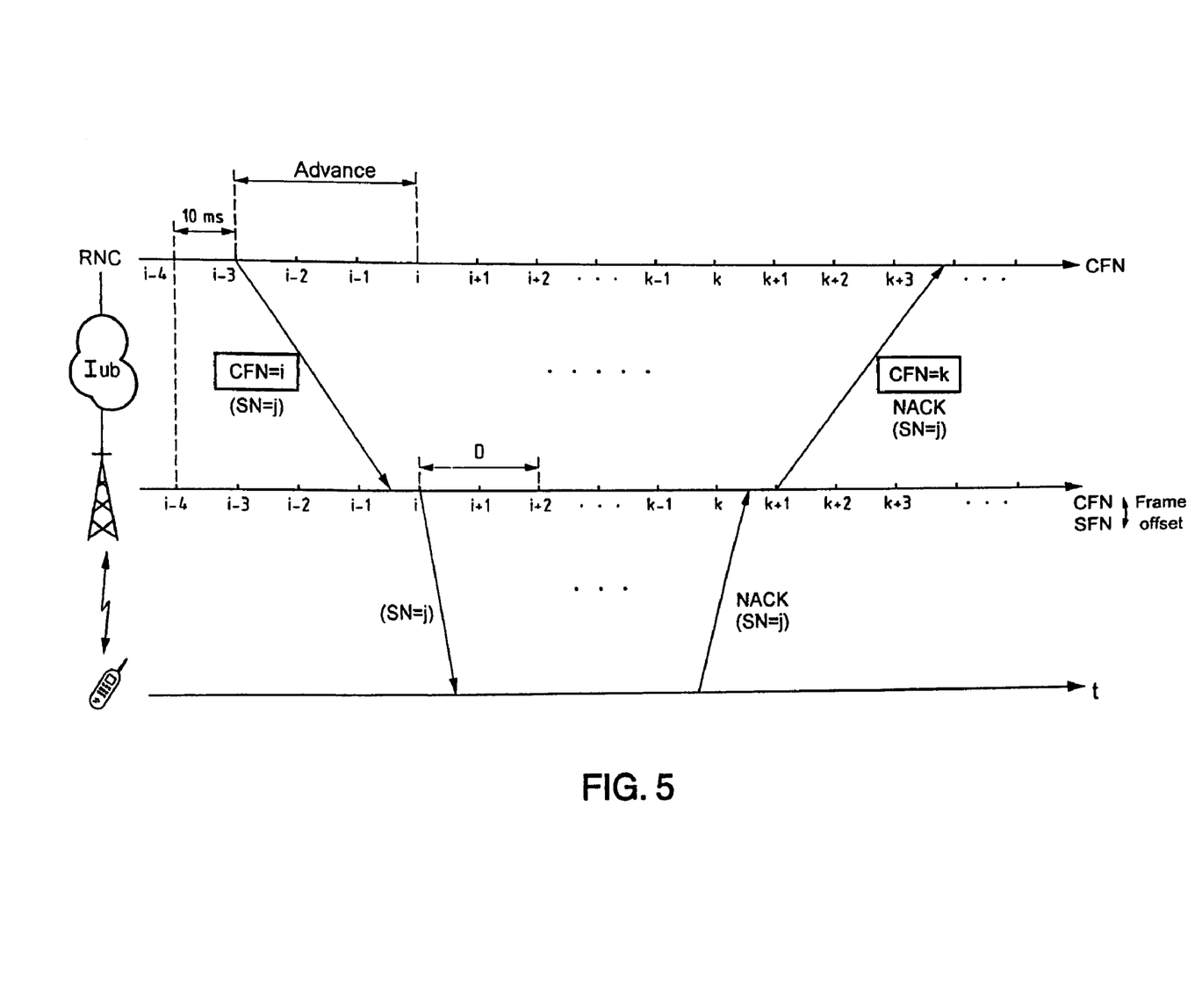
FIG. 5 is an example of a data retransmission mechanism according to the invention.

FIG. 5 shows an RNC and a UE exchanging RLC frames through an active set of Nodes B. The RLC frames are encapsulated in FP frames over the Iub interface between the RNC and the Nodes B.

In the example in FIG. 5, the RNC transmits an FP data frame with CFN=i according to the temporal axis of the CFNs described previously. This means that the FP frame sent by the RNC will form the content of a data transmission by the Nodes B of the active set towards the UE, at an instant corresponding to CFN=i. For this purpose, the transmission of the frame has been advanced by the RNC. This advance has been estimated at approximately 30 milliseconds (in other words three intervals of 10 ms in the time scale of the CFNs) in the example in FIG. 5, since the frame is sent by the RNC at the instant CFN=i−3. The data included in this downlink frame are routed from the Nodes B to the UE concerned, in an RLC data frame. According to a conventional numbering system, the RLC frame also has a sequence number SN=j.

Let us now consider an uplink RLC acknowledgement frame containing an acknowledgement information element of the NACK type, indicating incorrect reception of the RLC data frame with SN=j, previously transmitted by the RNC. This NACK can be sent by the UE, for example, in response to polling from the RNC, as described above. This NACK is initially routed from the UE to each Node B of the active set. Each Node B of the active set encapsulates the acknowledgement frame containing this NACK in a FP frame to transfer it to the RNC, including in the frame a CFN number corresponding to the instant of reception of the uplink RLC frame by this Node B. In the example in FIG. 5, the Node B which is represented transmits the NACK by encapsulating it in a FP frame containing the NACK and having CFN=k, since the NACK has been received at the Node B in the time interval corresponding to CFN=k (in other words, the time interval between the symbols CFN=k and CFN=k+1 in FIG. 5).

Upon reception of this uplink FP frame, the RNC makes a comparison between the CFNs representing, on the one hand, the instant of transmission by the Nodes B over the radio interface of the transmitted data frame, with a sequence number SN=j (CFN=i, stored previously), and, on the other hand, the instant of reception by the Node B of the uplink frame containing the NACK signal for this data frame SN=j (CFN=k). This is equivalent to comparing the integers i and k. This comparison provides independence from fluctuations of transmission times over the Iub interface. It also provides independence from the processing times of the Nodes B, for example when the data of a received frame have to be transferred.

If the time difference measured by k−i is greater than a predetermined threshold, indicated as D in FIG. 5, this means that the NACK has been received by the Node B with a delay of more than D, with respect to the last transmission by the Node B of the data frame in question. The threshold D is conveniently a multiple of 10 milliseconds, allowing it to be expressed as an integer. It can be of the order of the RTD over the Uu interface between the Nodes B and the UE, including the time for data processing by the UE. If a means of estimating this RTD over the Uu interface is available, it can be advantageous to provide a mechanism for varying the threshold D. However, since this RTD is most frequently small by comparison with the propagation time over the Iub interface, the threshold D can also have a fixed value which is relatively small (for example, D=1 or 2 in units of 10 ms), or even zero in one embodiment of the invention, which is equivalent to a simple comparison between the values of the integers k and i. The latter case where D=0 will be examined below, without restrictive intent.

Thus, if k is an integer greater than i, this means that the uplink radio frame carrying the NACK has been received by the Node B in question after the transmission by this Node B of the data corresponding to the data frame which has not been correctly acknowledged. This mechanism thus ensures that the NACK transmitted to the RNC follows the transmission of the initial data frame by the Node B, and is therefore a justified negative acknowledgement. Retransmission of the data can then be carried out by the RNC on reception of the NACK.

Conversely, if k is less than i, this means that the NACK has probably been sent before the transmission by the Node B of the data frame sent from the RNC. This NACK therefore does not take into account any correct reception of the data of the radio frame with CFN=i by the UE. In this case, the RNC ignores the NACK and therefore does not immediately order the retransmission of the data.

In the example shown in FIG. 5, a single RLC frame is transmitted every 10 milliseconds. However, the sending of a plurality of RLC frames can be envisaged during this period.

Additionally, the scale of CFNs, as defined in the UMTS system, is limited to 4096, which means that CFN=1 follows CFN=4096 on the time axis shown in FIG. 5. In these conditions, it must be considered that the comparison between the integers k and i is expressed in modulo 4096 form.

It may also be noted that the invention is not limited to any particular acknowledgement and retransmission algorithm. On the contrary, the RNC can selectively retransmit a set of frames which it considers not to have been received correctly on the basis of any acknowledgement.

The invention has been described above in its application to a UMTS network. However, any other communication system can be envisaged for the application of the invention.

The invention claimed is:

1. Method for controlling data retransmission from a control unit over a connection established with a radio terminal,
   in which the control unit and the terminal exchange over the said connection, by means of at least one base station, first frames comprising data frames sent to the terminal and acknowledgement frames sent by the terminal and containing acknowledgement information in respect of the first data frames,
   in which the first frames are encapsulated, with corresponding timestamping information, in second frames for transmission between the control unit and each base station over an asynchronous interface,
   in which the timestamping information accompanying one of the data frames over the asynchronous interface indicates an instant of transmission of the said data frame by each base station with reference to a time counter specific to a radio section of the said connection,
   in which the timestamping information accompanying one of the acknowledgement frames over the asynchronous interface indicates an instant of reception of the said acknowledgement frame by each base station with reference to the said time counter,
   wherein the method comprises the following steps:
      storing, at the control unit, the timestamping information indicating an instant of transmission of a data frame; and
      upon reception at the control unit of an acknowledgement frame accompanied by time stamping information indicating an instant of transmission and containing acknowledgement information interpreted as indicating non-reception of the said data frame by the terminal, selectively considering or ignoring the said acknowledgement information for controlling a retransmission of the said data frame, depending on a result of a comparison between the said instants of reception and transmission.

2. Method according to claim 1, in which the selectively considering or ignoring the said acknowledgement information comprises the alternatives of:
   ignoring the said acknowledgement information if the said instant of reception is not later than the said instant of transmission by an amount exceeding a threshold; or
   taking into account the said acknowledgement information if the said instant of reception is later than the said instant of transmission by an amount exceeding the said threshold.

3. Method according to claim 2, in which the said threshold is zero.

4. Method according to claim 2, in which the said threshold is of the order of ten milliseconds.

5. Method according to claim 2, in which the said threshold is variable.

6. Method according to claim 2, in which the threshold is less than 10 milliseconds.

7. Control unit comprising means for exchanging first frames with a radio terminal over a connection established with the said radio terminal, by means of at least one base station,
   in which the first frames comprise data frames sent to the terminal and acknowledgement frames sent by the terminal and containing acknowledgement information in respect of the first data frames,
   in which the first frames are encapsulated, with corresponding timestamping information, in second frames for transmission between the control unit and each base station over an asynchronous interface,
   in which the timestamping information accompanying one of the data frames over the asynchronous interface indicates an instant of transmission of the said data frame by each base station with reference to a time counter specific to a radio section of the said connection,
   in which the timestamping information accompanying one of the acknowledgement frames over the asynchronous interface indicates an instant of reception of the said acknowledgement frame by each base station with reference to the said time counter,
   wherein the control unit additionally comprises:
      means for storing the timestamping information indicating an instant of transmission of a data frame; and
      means by which, upon reception at the control unit of an acknowledgement frame accompanied by time stamping information indicating an instant of transmission and containing acknowledgement information interpreted as indicating non-reception of the said data frame by the terminal, the said acknowledgement information for controlling retransmission of the said data frame is selectively considered or ignored, depending on a result of a comparison between the said instants of reception and transmission.

8. Control unit according to claim 7, in which the means of selectively considering or ignoring the said acknowledgement information are arranged:
   to ignore the said acknowledgement information if the said instant of reception is not later than the said instant of transmission by an amount exceeding a threshold; and
   to take into account the said acknowledgement information if the said instant of reception is later than the said instant of transmission by an amount exceeding the said threshold.

9. Control unit according to claim 8, in which the said threshold is zero.

10. Control unit according to claim 8, in which the said threshold is of the order of ten milliseconds.

11. Control unit according to claim 8, in which the said threshold is variable.

12. Control unit according to claim 8, in which said threshold is less than 10 milliseconds.

* * * * *